United States Patent
Mo

(10) Patent No.: US 12,293,065 B2
(45) Date of Patent: May 6, 2025

(54) METHOD FOR ADJUSTING INTERFACE DISPLAY STATE, AND ELECTRONIC DEVICE

(71) Applicant: GUANGDONG OPPO MOBILE TELECOMMUNICATIONS CORP., LTD., Guangdong (CN)

(72) Inventor: Boyu Mo, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 87 days.

(21) Appl. No.: 18/331,773

(22) Filed: Jun. 8, 2023

(65) Prior Publication Data

US 2023/0325062 A1    Oct. 12, 2023

Related U.S. Application Data

(63) Continuation of application No. PCT/CN2021/122707, filed on Oct. 8, 2021.

(30) Foreign Application Priority Data

Dec. 16, 2020 (CN) .......................... 202011490723.6
Jun. 3, 2021 (CN) .......................... 202110620173.3

(51) Int. Cl.
G06F 3/04845 (2022.01)

(52) U.S. Cl.
CPC .............. *G06F 3/04845* (2013.01); *G06F 2203/04806* (2013.01)

(58) Field of Classification Search
None
See application file for complete search history.

(56) References Cited

U.S. PATENT DOCUMENTS

| | | | |
|---|---|---|---|
| 6,501,487 B1 | 12/2002 | Taguchi | |
| 9,310,974 B1 * | 4/2016 | Narayanan | G06F 3/0484 |
| 9,547,412 B1 | 1/2017 | Dillon | |
| 9,754,398 B1 | 9/2017 | Cardwell et al. | |
| 10,019,140 B1 * | 7/2018 | Bell | G06F 3/0304 |
| 10,772,595 B2 * | 9/2020 | Lee | A61B 8/463 |

(Continued)

FOREIGN PATENT DOCUMENTS

| | | |
|---|---|---|
| CN | 102436343 A | 5/2012 |
| CN | 102789359 A | 11/2012 |

(Continued)

OTHER PUBLICATIONS

Rejection decision in the corresponding Chinese patent Application No. 202310078398.X, mailed Jan. 13, 2024 (14 pages).

(Continued)

*Primary Examiner* — Toan H Vu
(74) *Attorney, Agent, or Firm* — Ladas & Parry, LLP

(57) ABSTRACT

Disclosed are a method for adjusting an interface display state, and an electronic device. The method is performed by an electronic device with a display screen, and the method includes: in response to a zooming operation for a display interface of a target application, determining attribute information of the display interface during the zooming operation; and in response to the end of the zooming operation, adjusting a display state of the display interface when the attribute information satisfies a pre-set condition.

16 Claims, 8 Drawing Sheets

(56) References Cited

U.S. PATENT DOCUMENTS

| | | | |
|---|---|---|---|
| 2013/0100162 A1* | 4/2013 | Iseri | G09G 5/14 345/660 |
| 2013/0346865 A1 | 12/2013 | Yuan et al. | |
| 2015/0135126 A1* | 5/2015 | Shao | G06F 3/0488 715/781 |
| 2015/0331594 A1* | 11/2015 | Terada | G06F 3/0488 715/801 |
| 2015/0363082 A1* | 12/2015 | Zhao | G06F 3/04883 715/800 |
| 2017/0192652 A1 | 7/2017 | Wang | |
| 2020/0226719 A1* | 7/2020 | Chen | G06T 11/001 |
| 2020/0371673 A1* | 11/2020 | Faulkner | G06F 3/017 |
| 2021/0149558 A1* | 5/2021 | Qian | G06F 3/04845 |

FOREIGN PATENT DOCUMENTS

| | | |
|---|---|---|
| CN | 103593138 A | 2/2014 |
| CN | 104243668 A | 12/2014 |
| CN | 104777976 A | 7/2015 |
| CN | 105094592 A | 11/2015 |
| CN | 105549824 A | 5/2016 |
| CN | 106648434 A | 5/2017 |
| CN | 109164965 A | 1/2019 |
| CN | 110286840 A | 9/2019 |
| CN | 110427151 A | 11/2019 |
| CN | 110955379 A | 4/2020 |
| CN | 111443836 A | 7/2020 |
| CN | 111782121 A | 10/2020 |
| CN | 111966252 A | 11/2020 |
| CN | 112083989 A | 12/2020 |
| CN | 112527165 A | 3/2021 |
| CN | 113342445 A | 9/2021 |
| CN | 113672133 A | 11/2021 |
| EP | 2648087 A2 | 10/2013 |
| EP | 4283450 A1 | 11/2023 |
| JP | 2002086833 A | 3/2002 |
| JP | 2008271094 A | 11/2008 |
| JP | 2013218689 A | 10/2013 |
| JP | 2015219738 A | 12/2015 |
| JP | 2016038640 A | 3/2016 |
| KR | 960014831 B1 | 10/1996 |
| KR | 20080040187 A | 5/2008 |
| KR | 20110024365 A | 3/2011 |
| KR | 1020130113978 A | 10/2013 |
| WO | 2022127304 A1 | 6/2022 |

OTHER PUBLICATIONS

Chinese First Office Action and search report in the corresponding Chinese Application No. 202310078398.X, mailed Aug. 11, 2023.
Chinese Second Office Action and search report from the corresponding Chinese Patent Application No. 202310078398.X, mailed Sep. 29, 2023.
First Office Action and search report in the corresponding Chinese Application No. 202110620173.3, mailed Aug. 12, 2022.
Notification to Grant Patent Right for Invention in the corresponding Chinese Application No. 202110620173.3, mailed Nov. 18, 2022.
International search report in the corresponding International Application No. PCT/CN2021/122707, mailed Dec. 24, 2021.
Written Opinion of the International Searching Authority in International Application No. PCT/CN2021/122707, mailed Dec. 24, 2021. With machine English translation provided by WIPO.
European Search Report for the corresponding European Application No. 21905233.9, mailed Apr. 26, 2024 (9 pages).
Japanese Notice of Reasons for Refusal for the corresponding Japanese Patent Application No. 2023-535954, mailed Jun. 7, 2024.
Japanese Notice of Reasons for Refusal from the corresponding Japanese Patent Application No. 2023-535954, mailed Sep. 20, 2024 (8 pages).
Korean Request for the Submission of an Opinion, corresponding, Korean Application No. 10-2023-7023138, mailed Nov. 18, 2024 (77 pages).
Chinese Notification of Reexamination from the corresponding Chinese Application No. 202310078398.X, mailed Mar. 18, 2025.

* cited by examiner

METHOD FOR ADJUSTING INTERFACE DISPLAY STATE, AND ELECTRONIC DEVICE

CROSS-REFERENCE TO RELATED APPLICATIONS

The present application is a continuation of International (PCT) Patent Application No. PCT/CN2021/122707 filed on Oct. 8, 2021, which claims priorities to Chinese patent application No. 202011490723.6, filed on Dec. 16, 2020, and Chinese patent application No. 202110620173.3, filed on Jun. 3, 2021, the contents of all of which are hereby incorporated by reference.

TECHNICAL FIELD

Embodiments of the present application relate to electronic technologies, and relate to but is not limited to a method and an apparatus for adjusting an interface display state, an electronic device, and a non-transitory computer-readable storage medium.

BACKGROUND

At present, as productivity levels increase, an electronic device (such as a smartphone, a tablet computer) is playing an increasingly important role in people's work and life, and the interactive operations between the display screen of the electronic device and the user are increasing. In the display screen, the display state of the application interface is also various, and the user can adaptively adjust the display state of the application interface according to the actual use condition. For example, the electronic device produced by some manufacturers can be changed into a full screen by pulling down a bottom transverse bar of the small window, and the electronic device produced by some manufacturers can be changed into the full screen by clicking the full screen button on the top of the small window.

SUMMARY OF THE DISCLOSURE

An embodiment of the present application provides a method for adjusting the interface display state, which is performed by the electronic device with the display screen. The method includes: in response to a zooming operation for the display interface of the target application, determining the attribute information of the display interface during the zooming operation; and in response to an end of the zooming operation, adjusting the display state of the display interface when the attribute information satisfies a preset condition.

An embodiment of the present application provides an electronic device. The electronic device at least includes a memory, a communication bus, and a processor. The memory is configured to store an adjustment program of the interface display state. The communication bus is configured to realize the connection communication between the processor and the memory. The processor is configured to execute the adjustment program of the interface display state stored in the memory, to implement the operations of: in response to the zooming operation for the display interface of the target application, determining the attribute information of the display interface during the zooming operation; and in response to the end of the zooming operation, adjusting the display state of the display interface when the attribute information satisfies the preset condition.

An embodiment of the present application provides a method for adjusting an interface display state, performed by an electronic device with a display screen. The method includes in response to a zooming operation for a display interface of a target application, determining size information of the display interface during the zooming operation. Achieving the zooming operation includes: dragging a bottom angle of the display interface of the target application; and in response to an end of the zooming operation, the display interface is adjusted to a second display state when the size information of the display interface is less than or equal to a preset size information.

DETAILED DESCRIPTION

Figure 1A:
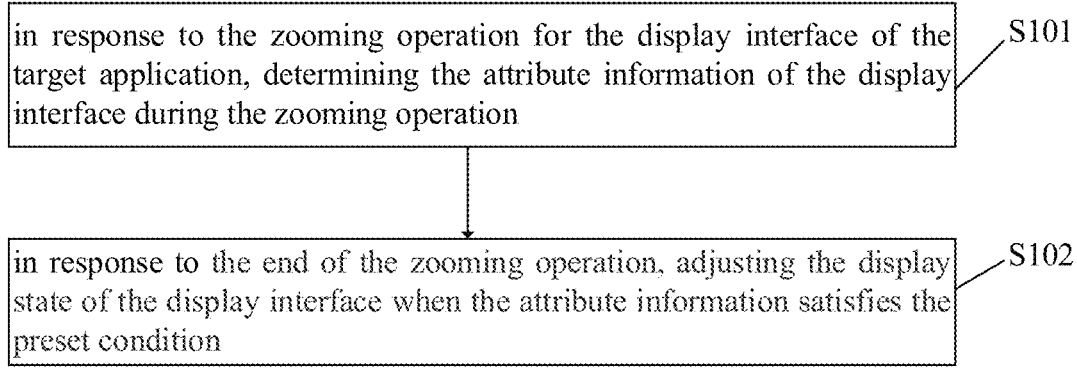
FIG. 1A is a first implementation flow diagram of a method for adjusting an interface display state according to an embodiment of the present application.

The technical solutions of the present application are further described in detail below with reference to the accompanying drawings and embodiments. Obviously, the described embodiments are only a part of the embodiments of present application, but are not all embodiments. Based on the embodiments of the present application, all other embodiments obtained by a person of ordinary skill in the art without creative efforts shall fall within the protection scope of the present application. In the following description, to "some embodiments", which describe a subset of all possible embodiments, it may be understood that "some embodiments" may be the same subset or different subsets of all possible embodiments, and may be combined with each other without conflicts.

In the following description, the suffix used to represent an element such as "module", "component" or "unit" is merely illustrative of the present application, which itself is not of a particular meaning. Therefore, the "module", "component" or "unit" may be used in a mixed manner. The terms "first\second\third" involved in the embodiments of the present application are merely different similar objects, and do not represent a specific sorting for an object. It can be understood that "first\second\third" may exchange a specific sequence or sequential order in an allowable situation, so that the embodiments of the present application described herein can be implemented in an order other than illustrated or described herein.

At present, a user can adaptively adjust a display state of an application interface of an electronic device according to actual use conditions, for example, the electronic device produced by some manufacturers can be changed into a full screen by pulling down a bottom transverse bar of a small window, and the electronic device produced by some manufacturers can be changed into the full screen by clicking a full screen button on a top of the small window. However, the above-mentioned adjustment modes have various disadvantages, for example, the solution of "changing into the full screen by pulling down the bottom transverse bar of the small window" is characterized in that two transverse bars are designed on the small window, the learning cost of the user is higher, the solution is not consistent with the full screen switching operation, the learning easiness is not high, and the aesthetic is poor. The solution of "adding a button" also seriously affects the effective display area of the floating window due to the fact that a dominant button is designed on the floating window, which is inaesthetic.

Therefore, an embodiment of the present application provides a method for adjusting an interface display state, which is performed by an electronic device with a display screen. The method includes: in response to a zooming operation for the display interface of the target application, determining the attribute information of the display interface during the zooming operation; and in response to an end of the zooming operation, adjusting the display state of the display interface when the attribute information satisfies a preset condition.

In some embodiments, "in response to the end of the zooming operation, adjusting the display state of the display interface when the attribute information satisfies the preset condition" includes: in response to the end of the zooming operation, adjusting the display state of the display interface when the time length of the attribute information satisfying the preset condition is greater than or equal to the preset time length.

In some embodiments, "in response to the zooming operation for the display interface of the target application, determining the attribute information of the display interface during the zooming operation" includes: in response to an enlarging operation for the display interface of the target application, determining the position information of a boundary of the display interface during the enlarging operation. The "in response to the end of the zooming operation, adjusting the display state of the display interface when the attribute information satisfies the preset condition" includes: in response to the end of the enlarging operation, adjusting the display interface to a first display state when the position information is in a specific position range of the display screen.

In some embodiments, "in response to the end of the enlarging operation, adjusting the display interface to the first display state when the position information is in the specific position range of the display screen" includes: in response to the end of the enlarging operation, adjusting the display interface to the first display state when the time length of the position information within the specific position range of the display screen is greater than or equal to a first preset time length.

In some embodiments, "adjusting the display interface to the first display state" includes adjusting the display interface to the full screen display.

In some embodiments, the specific position range of the display screen includes at least one of: a top edge boundary range of the display screen, a bottom edge boundary range of the display screen, and a side edge boundary range of the display screen.

In some embodiments, "in response to the zooming operation for the display interface of the target application, determining the attribute information of the display interface during the zooming operation" includes: determining the size information of the display interface in response to a reducing operation for the display interface of the target application. The "in response to the end of the zooming operation, adjusting the display interface to the first display state when the attribute information satisfies the preset condition" includes: in response to the end of the reducing operation, adjusting the display interface to the second display state when the size information is matched with the preset size.

In some embodiments, "in response to the end of the reducing operation, adjusting the display interface to the second display state when the size information is matched with the preset size" includes: in response to the end of the reducing operation, adjusting the display interface to the second display state when the time length of the size information matched with the preset size is greater than or equal to the second preset time length.

In some embodiments, "adjusting the display interface to the second display state" includes: adjusting the display interface to the icon display; alternatively, adjusting the display interface to the thumbnail display.

In some embodiments, the method further includes: in response to the end of the zooming operation, adjusting the size of the display interface according to the zooming operation when the attribute information does not satisfy the preset condition.

In some embodiments, the method further includes: in response to the end of the zooming operation, adjusting the size of the display interface according to the zooming operation when the time length of the attribute information satisfied the preset condition is less than the preset time length.

The embodiment of the present application provides a method for adjusting the interface display state. The method is performed by the electronic device with the display screen. The functions realized by the method can be realized by calling the program code with the processor in the electronic device, and the program code can be stored in the non-transitory computer-readable storage medium of the electronic device. FIG. 1A is a first implementation flow diagram of the method for adjusting the interface display state according to an embodiment of the present application, as shown in FIG. 1A, the method includes the following operations.

At operation S101, the method includes: in response to the zooming operation for the display interface of the target application, determining the attribute information of the display interface during the zooming operation.

Figure 1B:
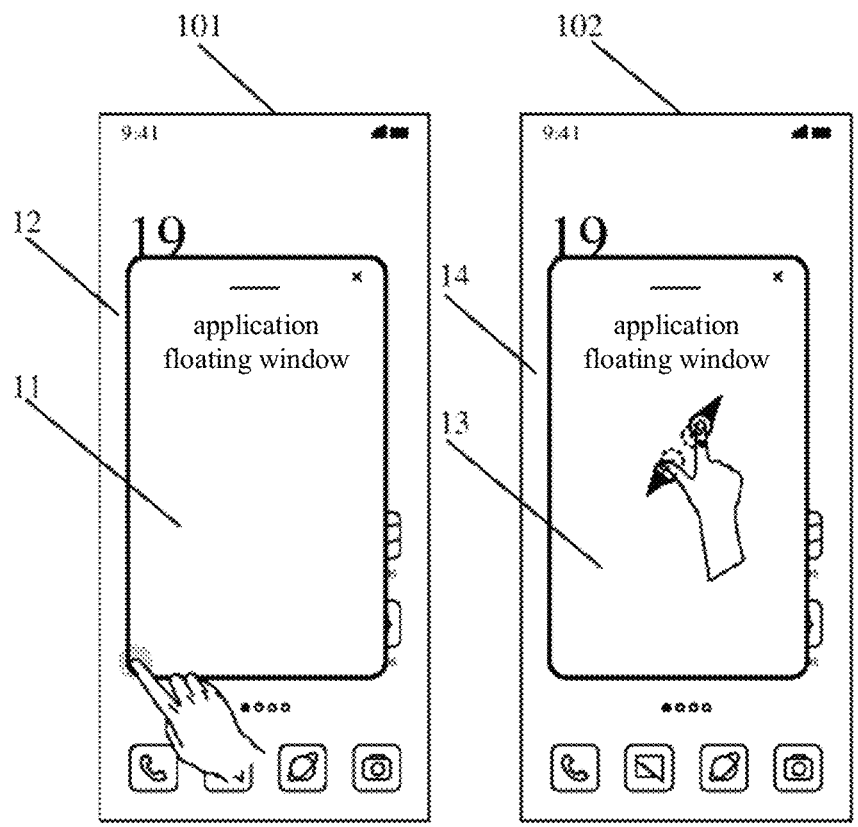
FIG. 1B is a schematic diagram of an implementation manner of a zooming operation according to an embodiment of the present application.

Here, the electronic device may be various types of devices with information processing capabilities, such as a cell phone, a PDA (personal digital assistant), a tablet computer, a navigator, an all-in-one computer, or the like. The target application is an application on the electronic device, which can be a system application, such as a camera, a gallery, a memo, a calculator, or the like. The target application can also be a third-party application, such as WeChat, Tiktok, some editing applications, shopping applications, and so on. This is, the specific type of the target application is not limited in the embodiment of the present application, as long as the display interface can do the target application of the zooming operation. The zooming operation, refers to a zooming operation corresponding to the size of the display interface of the target application. Moreover, the zooming operation includes the enlarging operation and the reducing operation. FIG. 1B is a schematic diagram of an implementation manner of the zooming operation according to an embodiment of the present application, in FIG. 1B, as shown in picture 101, the way to achieve the zooming operation is: dragging the bottom angle of the display interface of the target application 11, to adjust the size of the display interface in the display screen 12. As shown in the picture 102, the way to achieve the zooming operation is: sliding the thumb and index finger outward or inward at the same time on the target application 13, to adjust the size of the display interface in the display screen 14.

The zooming operation may also be performed in other ways. For example, the virtual sliding operation or the virtual dragging operation can implement the zooming of the display interface of the target application, such as, simulated sliding operation of mouse, hovering gesture, VR (Virtual Reality) operation and so on. When the user operates the electronic device, the hovering zooming operation can be carried out. The gesture of the user in front of the display screen can be acquired by using the camera of the electronic device; the shape, position and other information of the gesture is further recognized by means of algorithm, to determine the zooming size. A computer simulation system can also be created by utilizing the VR technology, to generate a simulation environment. The objects such as the electronic device and the like are displayed through a three-dimensional model, so that the user can zoom a display interface of the target application in the three-dimensional model. In the embodiment of the present application, the specific implementation mode of zooming operation is not limited.

Here, the attribute information of the display interface during the zooming operation includes at least one of the size information of the display interface and the position information of the display interface. The position information of the display interface includes the boundary position information of the display interface, and the vertex angle position information of the display interface. For example, when the display interface of the target application is a rectangle, the boundary position information of the display interface includes the position information of any pixel point on four sides of display interface. The vertex angle position information of the display interface is the position information of the four vertex angles of the rectangle. The size information of the display interface shows the size of the display interface. For example, when the display interface of the target application is the rectangle, the display interface of the target application can be enlarged from 5 cm*2 cm to 15 cm*6 cm or reduced from 18 cm*10 cm to 4 cm*2 cm in the zooming process.

In embodiments of the present application, the target application may be displayed as the small window on the display screen of the electronic device before zooming operation. The small window refers to the small window in the display screen of the electronic device, can be used to present a reduced application interface, and the user can operate the application normally within the small window. The target application may also be displayed on the display screen of the electronic device in other ways before zooming operation. For example, the target application is in the full screen display mode before the zooming operation, and the zooming operation is the reducing operation of the display interface of the target application. The display mode of the target application before the zooming operation is not limited in the embodiment of the present application.

At operation S102, the method includes: in response to the end of the zooming operation, adjusting the display state of the display interface when the attribute information satisfies the preset condition.

Here, when the display screen is a touch screen, and the zooming operation is a touch zooming operation on the touch screen, the end of the zooming operation may be a lift operation after dragging or sliding a certain distance. When the zooming operation is a hovering gesture zooming operation in front of the display screen of the electronic device, the end of the zooming operation may be the zooming operation end gesture appears after dragging or sliding a certain distance. For example, when the user makes a gesture to open the palm after dragging or sliding a certain distance in front of the display screen, which represents the end of the zooming operation.

In embodiments of the present application, when the attribute information is the size of the display interface of the target application, the attribute information satisfies the preset condition, which can be that the size of the display interface is matched with the preset size. When the attribute information is the position information of the display interface of the target application, the attribute information satisfies the preset condition, which can be that the boundary of the display interface is positioned in the boundary range of the display screen.

Here, the display state of the display interface of the target application, includes at least one of: a full screen display state, an icon display state, and a thumbnail display state. The icon display state incudes "bubble"-like icon display state and so on. For example, in the process of reducing the display interface of the target application, when it is reduced to a certain extent and the size of the display interface is matched with the preset size, the display interface of the target application is adjusted to icon display. In the process of enlarging the display interface of the target application, when one boundary of the target application is in the boundary range of the display screen of the electronic device, the display interface of the target application is adjusted to the full screen display.

The enlargement or reduction of size of the display interface of the target application does not belong to the adjustment of the display state of the display interface. The full screen display state can be regarded as the display state of a special display interface.

In some embodiments, when the attribute information satisfies the preset condition, the display state of the display interface is adjusted, which can be that the size of the display interface can be matched with the preset size, or the boundary of the display interface is within the boundary range of the display screen, the display state of the display interface is adjusted. When the time length that the size of the display interface matches the preset size reaches the preset time length, or the time length that the boundary of the display interface is within the boundary range of the display screen reaches the preset time length, the display state of the display interface is adjusted. Here, the preset time length can be set before the device leaves the factory, can also be set by the user according to the actual use needs. Further, it may also be prompted when the preset time length is reached, prompting the user to loosen the hand to adjust the display state of the display interface at the moment.

In the embodiment of the present application, in response to zooming operation for the display interface of the target application, the attribute information of the display interface is determined during the zooming operation; in response to the end of the zooming operation, when the attribute information satisfies the preset condition, the display state of the display interface is adjusted, so that a new interaction mode is provided to bring more possibilities and convenience to the operation of the small windows.

Based on above embodiments, the embodiment of the present application further provides a method for adjusting the interface display state. The method includes the following operations.

Operation S111, in response to the zooming operation for the display interface of the target application, determining the attribute information of the display interface during the zooming operation.

Operation S112, in response to the end of the zooming operation, adjusting the display state of the display interface when the time length of the attribute information satisfying the preset condition is greater than or equal to the preset time length.

Here, after the attribute information satisfies the preset condition, a judgment can be made to judge whether the time length of the attribute information satisfying the preset condition is greater than or equal to the preset time length, and if so, the display state of the display interface can be adjusted.

For example, in the process of reducing the display interface, when the time length that the size of the display interface matches the preset size reaches the preset time length, the display state of the display interface is adjusted. During enlarging the display interface, when the time length that the boundary of the display interface is within the boundary range of the display screen reaches the preset time length, the display state of the display interface is adjusted. Here, the preset time length can be set before the device leaves the factory, can also be set by the user according to the actual use needs. Further, it may also be prompted when the preset time length is reached, prompting the user to loosen the hand to adjust the display state of the display interface at the moment.

When the preset time length is set to zero, it is equivalent to not performing the relevant operation of judging the time length, and the display state of the display interface is adjusted after judging that the attribute information satisfies the preset conditions. In an embodiment of the present application, by in response to the zooming operation of the display interface of the target application, the attribute information of the display interface in the process of the zooming operation is determined. In response to the end of the zooming operation, when the time length of the attribute information satisfying the preset condition is greater than or equal to the preset time length, the display status of the display interface is adjusted. So that a new interaction mode is provided to bring more possibilities and convenience to the operation of the small windows, and at the same time reduce the user's operation error by judging the operation of the time length, thereby improving the user's operation accuracy.

Figure 2A:
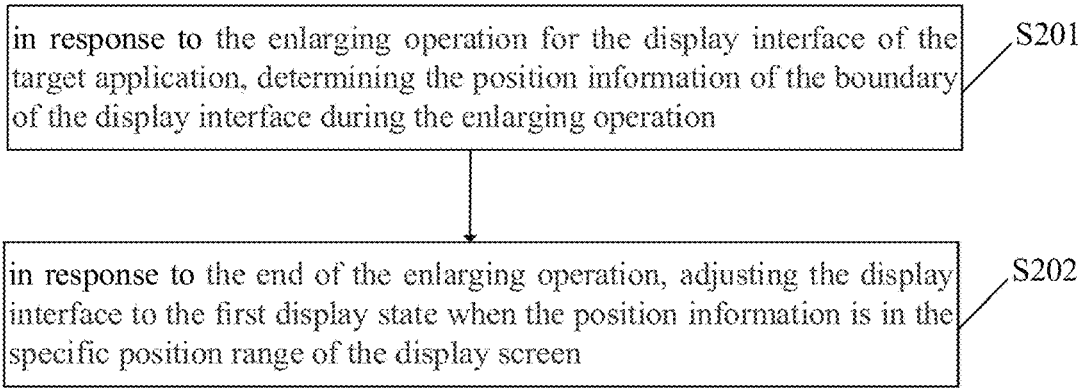
FIG. 2A is a second implementation flow diagram of the method for adjusting the interface display state according to an embodiment of the present application.

Based on above embodiments, the embodiment of the present application further provides a method for adjusting the interface display state. The method is performed by the electronic device with the display screen. FIG. 2A is a second implementation flow diagram of the method for adjusting the interface display state according to an embodiment of the present application, as shown in FIG. 2A, the method includes the following operations.

At operation S201, the method includes: in response to the enlarging operation for the display interface of the target application, determining the position information of the boundary of the display interface during the enlarging operation.

Here, the enlarging operation of the display interface, refers to an operation related to enlarging the size of the display interface. During the enlarging operation, as the size of the display interface increases, the position of the boundary of the display interface in the display screen is also changing. For example, when the display interface of the target application is the rectangle, the boundary of the display interface includes any side of the rectangle.

At operation S202, the method includes: in response to the end of the enlarging operation, adjusting the display interface to the first display state when the position information is within the specific position range of the display screen.

In embodiments of the present application, the specific position range of the display screen is the preset range. For example, the specific position range may be the boundary of the display screen. The position information within the specific position range of the display screen may be any one of a bottom edge, a top edge, and a side edge of the display interface of the target application. The specific position range can be set by manufacturer according to actual development result or by user according to actual use habit.

In some embodiments, the operation S202 of "in response to the end of the enlarging operation, adjusting the display interface to the first display state when the position information is within the specific position range of the display screen" includes: in response to the end of the enlarging operation, adjusting the display interface to the first display state when the time length of the position information within the specific position range of the display screen is greater than or equal to the first preset time length.

In some embodiments, adjusting the display interface to the first display state includes adjusting the display interface to the full screen display.

Figure 2B:
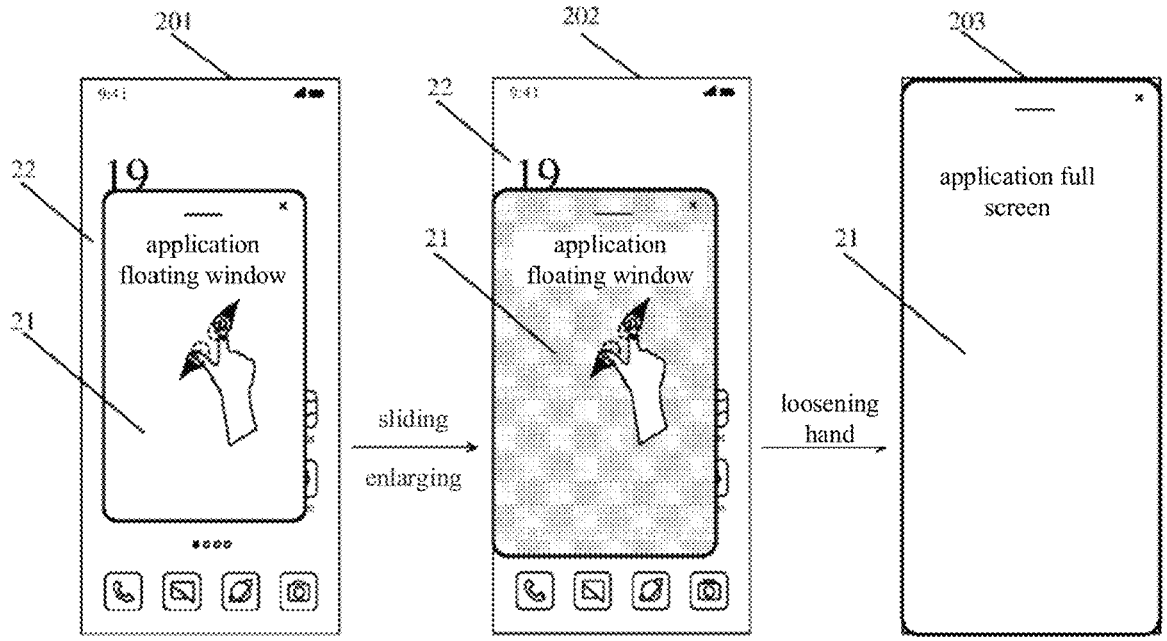
FIG. 2B is a first adjustment operation schematic diagram of the interface display state according to an embodiment of the present application.

FIG. 2B is a first adjustment operation schematic diagram of the interface display state according to an embodiment of the present application. In FIG. 2B, as shown in picture 201, the target application 21 is displayed as the small window on the display screen 22 of the electronic device. The user can slide outwardly through both the thumb and index finger on the target application 21, to enlarge the size of the display interface of the target application 21 in the display screen 22, so that the electronic device can correspondingly adjust the size of the display interface of the target application 21 in the display screen 22 in response to the outward sliding operation instruction. As shown in picture 202, during enlarging, when the user slides the bottom edge of the display interface of the target application 21 to the boundary of the display screen 22, a prompt is given (which may also be slid not only to the boundary of the display screen 22, but also stay at the boundary for more than 0.5 seconds, further, the electronic device recognizes that the time length for the bottom edge of the display interface to be located at the boundary of the display screen 22 is greater than 0.5 second, then a prompt is sent out). The prompt may be a text, an image, a graphic or the like, alternatively, the background color of the display interface may be changed to prompt. As shown in picture 203, when the user loosens the hand, the electronic device responds to the operation instruction of loosening the hand and changes the target application 21 into the full screen display state, so that the two behaviors of sliding adjustment of the small window size and icon switching can be organically and intuitively combined together, and the balance of efficiency, function and beauty is ingeniously achieved.

In some embodiments, the specific position range of the display screen includes at least one of: the top edge boundary range of the display screen, the bottom edge boundary range of the display screen, and the side edge boundary range of the display screen.

In the embodiment of the present application, the position information of the boundary of the display interface during the enlarging operation is determined by in response to the enlarging operation for the display interface of the target application; in response to the end of the enlarging operation, when the position information is in the specific position range of the display screen, the display interface is adjusted to the first display state, so that the display interface of the target application can be quickly and conveniently changed from the small window to the full screen display state.

Figure 3A:
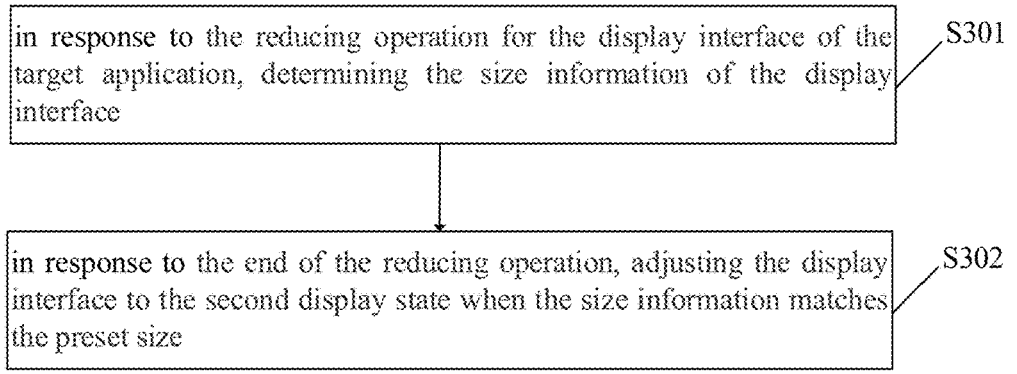
FIG. 3A is a third implementation flow diagram of the method for adjusting the interface display state according to an embodiment of the present application.

Based on above embodiments, the embodiment of the present application further provides a method for adjusting the interface display state. The method is performed by the electronic device with the display screen. FIG. 3A is a third implementation flow diagram of the method for adjusting the interface display state according to an embodiment of the present application, as shown in FIG. 3A, the method includes the following operations.

At operation S301, the method includes: in response to the reducing operation for the display interface of the target application, determining the size information of the display interface.

Here, the reducing operation of the display interface means the relevant operation of reducing the size of the display interface. The size of the display interface is also reduced gradually during the reducing operation.

At operation S302, the method includes: in response to the end of the reducing operation, adjusting the display interface to the second display state when the size information matches the preset size.

Here, the preset size may be a size corresponding to a minimum specification in which the floating window is reducible, for example, the minimum size in which the floating window is reducible may be set to 2 cm*1 cm in the display screen.

In some embodiments, the operation S302 of "in response to the end of the reducing operation, adjusting the display interface to the second display state when the size information matches the preset size" includes: in response to the end of the reducing operation, adjusting the display interface to the second display state when the time length of the size information matched with the preset size is greater than or equal to the second preset time length.

In some embodiments, in response to the end of the zooming operation, when the size information of the display interface is greater than the preset size, or a time length that the size information of the display interface is less than or equal to the preset size is less than a preset time length, a size of the display interface is adjusted according to a distance of dragging a bottom corner of the display interface of the target application during the zooming operation. The size of adjusted display interface is larger than the size of the display interface in the second display state.

In some embodiments, adjusting the display interface to the second display state includes adjusting the display interface to the icon display, alternatively, the display interface may be adjusted to the thumbnail display.

Figure 3B:
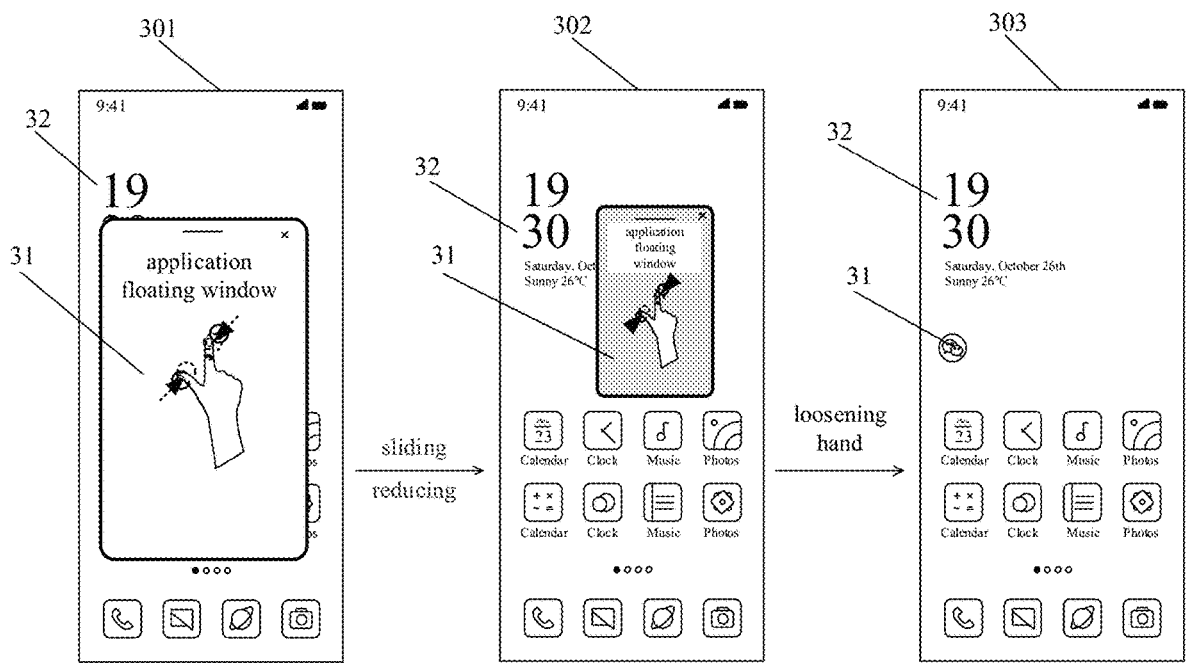
FIG. 3B is a second adjustment operation schematic diagram of the interface display state according to an embodiment of the present application.

FIG. 3B is a second adjustment operation schematic diagram of the interface display state according to an embodiment of the present application, in FIG. 3B, as shown in picture 301, the target application 31 is displayed as the small window on the display screen 32 of the electronic device within which the user can slide inwardly through both the thumb and index finger, to reduce the size of the display interface of the target application 31 in the display screen 32. Further, the electronic device correspondingly adjusts the size of the display interface of the target application 31 in the display screen 32 in response to the inward sliding operation instruction. As shown in picture 302, during reducing, when the user slides the size of the display interface to a set minimum specification, a prompt is sent out (or not only the size of the display interface is slid to the set minimum specification, and the residence time for reaching the minimum specification exceeds 0.5 second, further, the electronic device recognizes that the time length from the size of the display interface to the set minimum specification is greater than 0.5 second, then the prompt is sent out). The prompt may be a text, an image, a graphic or the like, alternatively, the background color of the display interface may be changed to prompt. As shown in picture 303, when the user loosens the hand, the electronic device responds to the operation instruction of loosening the hand and changes the display state of the target application 31 in the display screen 32 into the icon display state like the bubble, so that the two behaviors of sliding adjustment of the small window size and icon switching can be organically and intuitively combined together, and the balance of efficiency, function and beauty is ingeniously achieved.

In the embodiment of the present application, the size information of the display interface is determined by in response to the reducing operation for the display interface of the target application; in response to the end of the reducing operation, when the size information is matched with the preset size, the display interface is adjusted to the second display state, so that the display interface of the target application can be quickly and conveniently changed from the small window to the icon display state.

Figure 8:
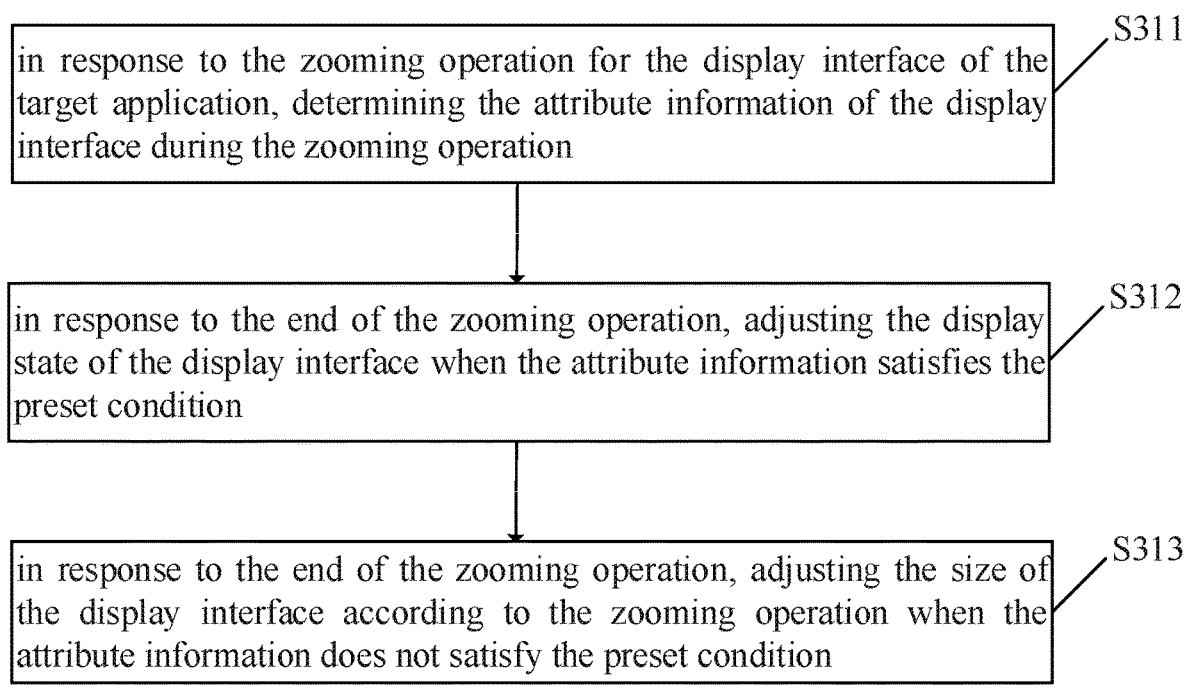
FIG. 8 is a flow diagram of a method for adjusting the interface display state according to an embodiment of the present application.

Based on above embodiment, the embodiment of the present application further provides a method for adjusting the interface display state, as shown in FIG. 8. The method includes the following operations.

At operation S311, the method includes: in response to the zooming operation for the display interface of the target application, determining the attribute information of the display interface during the zooming operation.

At operation S312, the method includes: in response to the end of the zooming operation, adjusting the display state of the display interface when the attribute information satisfies the preset condition.

At operation S313, the method includes: in response to the end of the zooming operation, adjusting the size of the display interface according to the zooming operation when the attribute information does not satisfy the preset condition.

In embodiments of the present application, when the attribute information is the size of the display interface of the target application, the attribute information does not satisfy the preset condition, which may be that the size of the display interface is not scaled to the preset size. For example, in the process of reducing the size of the display interface of the target application, when the size of the display interface is not reduced to the set minimum specification, the user selects to loosen the hand, and the size of the display interface is correspondingly reduced according to the dragged or sliding distance when the user loosens the hand.

When the attribute information is the position information of the display interface of the target application, the attribute information does not satisfy the preset condition, which may be that the boundary of the display interface does not touch the boundary of the display screen. For example, in the process of enlarging the size of the display interface of the target application, when the boundary of the display interface does not touch the boundary of the display screen, the user selects to loosen the hand, and the size of the display interface is correspondingly enlarged according to the dragged or sliding distance when the user loosens the hand.

Based on above embodiment, the embodiment of the present application further provides a method for adjusting the interface display state. The method includes the following operations.

At operation S321, the method includes: in response to the zooming operation for the display interface of the target application, determining attribute information of the display interface during the zooming operation.

At operation S322, the method includes: in response to the end of the zooming operation, adjusting the display state of the display interface when the time length of the attribute information satisfying the preset condition is greater than or equal to the preset time length.

At operation S323, the method includes: in response to the end of the zooming operation, adjusting the size of the display interface according to the zooming operation when the time length of the attribute information satisfying the preset condition is less than the preset time length.

In embodiments of the present application, when the attribute information is the size of the display interface of the target application, the attribute information satisfies the preset condition, which can be that the size of the display interface is matched with the preset size. When the attribute information is the position information of the display interface of the target application, the attribute information satisfies the preset condition, which can be that the boundary of the display interface is positioned in the boundary range of the display screen.

Furthermore, the time length of the size of the display interface matched with the preset size is less than the preset time length, or the time length of the boundary of the display interface in the boundary range of the display screen is less than the preset time length, the size of the display interface is correspondingly adjusted according to the zooming operation, instead of the display state of the display interface is adjusted. That is, only the attribute information of the display interface satisfies the preset condition, and the display state of the display interface is adjusted when the time length reaches the preset time length. For example, in reducing the size of the display interface of the target application, if the size of the display interface has been reduced to the set minimum specification, but the residence time of the user is less than 0.5 seconds, the user selects to loosen the hand, the size of the display interface is correspondingly reduced according to the dragged or sliding distance when the user loosens the hand. In enlarging the size of the display interface of the target application, if the boundary of the display interface is located in the boundary range of the display screen, but the time length for the user to enlarge the display interface to the boundary range is less than 0.5 second, the user loosens the hand, and the size of the display interface is correspondingly enlarged according to the dragged or sliding distance when the user loosens the hand.

Based on above embodiment, the embodiment of the present application further provides a method for adjusting the interface display state, and the method includes the following operations.

At operation S331, the method includes: in response to the zooming operation for the display interface of the target application, determining the attribute information of the display interface during the zooming operation.

At operation S332, the method includes: sending out the prompt information when the attribute information satisfies the preset condition, wherein the prompt information is configured for prompting the user to adjust the display state of the display interface when the zooming operation is finished at the moment, and canceling the adjustment of the display state of the display interface when the zooming operation is continued.

Here, when the attribute information satisfies the preset condition, the prompt information can be sent out to prompt the user that the display state of the display interface is adjusted when the user loosens the hand at the moment. The prompt information can be various types of prompt information. In the embodiment of the present application, the types, contents and the like of the prompt information are not limited. For example, during reducing the display interface, when the size of the display interface has been reduced to the set minimum specification, a circle of the same size as the icon is presented on the display interface to prompt the user that the display interface is adjusted to the icon display when he loosens the hand at the moment. For another example, in the process of enlarging the display interface, when the boundary of the display interface has been located within the boundary range of the display screen, a text prompt message is issued, or the boundary color of the display interface is changed to prompt the user that the display interface is adjusted to full-screen display when he loosens the hand at the moment.

In some embodiments, when the time length of the attribute information satisfying the preset condition exceeds the preset time length, the prompt message is sent out to prompt the user that the display state of the display interface is adjusted when the user loosens his hand at the moment. The prompt information can be various types of prompt information. In the embodiment of the present application, the types, contents and the like of the prompt information are not limited. For example, during reducing the display interface, when the size of the display interface has been reduced to the set minimum specification, and the user stays for more than 0.5 seconds when reducing to the minimum specification, a circle of the same size as the icon is presented on the display interface to prompt the user that the display interface is adjusted to the icon display when he loosens the hand at the moment. For another example, in the process of enlarging the display interface, when the boundary of the display interface has been located within the boundary range of the display screen, and the user enlarges the display interface to be located within the boundary range for more than 0.5 seconds, a text prompt message is issued, or the boundary color of the display interface is changed to prompt the user that the display interface is adjusted to full-screen display when he loosens the hand at the moment.

At operation S333, the method includes: in response to the end of the zooming operation, adjusting the display state of the display interface when the attribute information satisfies the preset condition.

Based on above embodiments, the embodiment of the present application further provides a method for adjusting the interface display state, which can organically and intuitively combine two behaviors of adjusting the size of the floating window and switching to the full screen.

Figure 4A:
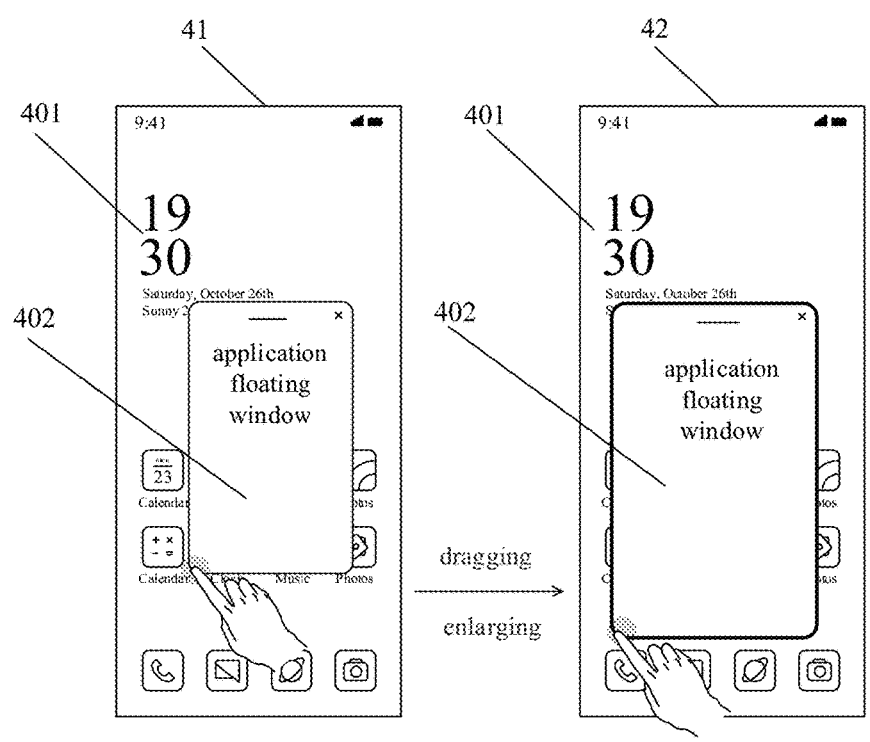
FIG. 4A is a first adjustment operation schematic diagram for switching to a full screen display according to an embodiment of the present application.

FIG. 4A is a first adjustment operation schematic diagram for switching to full screen display according to an embodiment of the present application. In FIG. 4A, as shown in picture 41, the target application 402 is displayed on the display 401 of the electronic device, and the target application 402 is displayed on the display screen 401 in the floating window manner. The user can adjust the size of the display interface in the display screen 401 by dragging the bottom angle of the display interface of the target application 402, so that the electronic device responds to the dragged operation instruction to correspondingly adjusts the size of the display interface of the target application 402 in the display screen 401. When the user drags the bottom angle outward, the electronic device enlarges the display interface of the target application 402, and the enlarged display interface is shown as the picture 42.

Figure 4B:
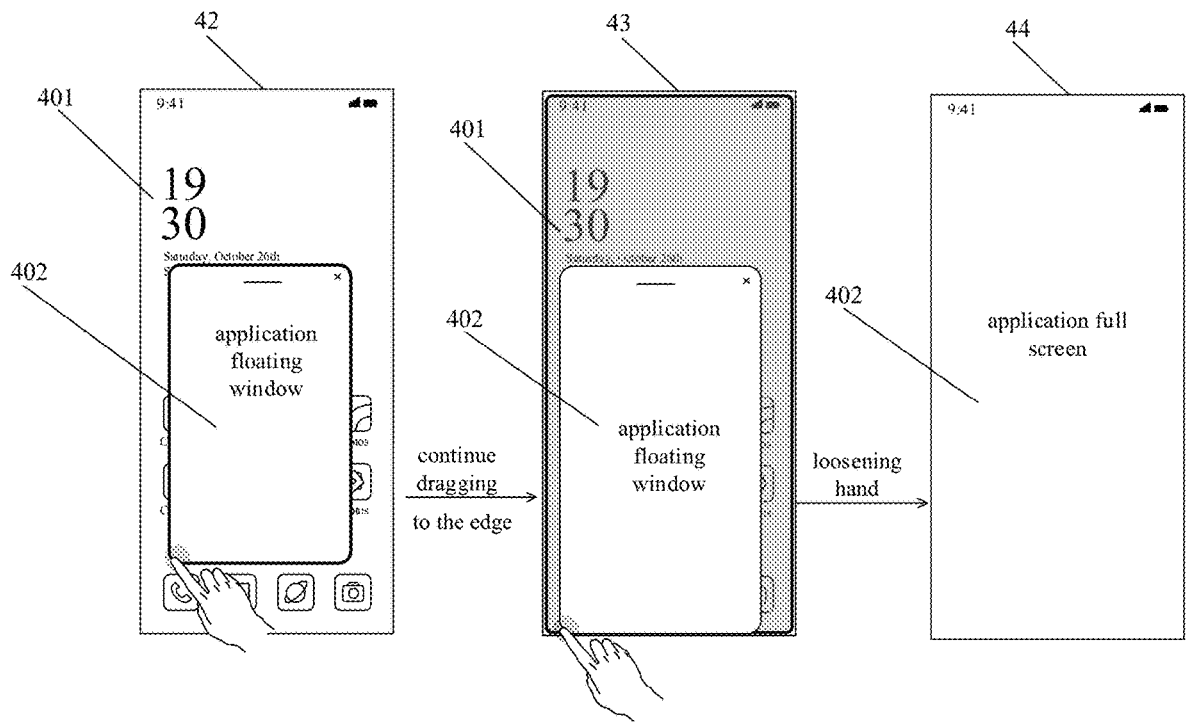
FIG. 4B is a second adjustment operation schematic diagram for switching to the full screen display according to an embodiment of the present application.

FIG. 4B is a second adjustment operation schematic diagram for switching to full screen display according to an embodiment of the present application, in FIG. 4B, as shown in picture 43, the user continues to drag the bottom angle of the display interface of the target application 402 outward, until the bottom angle of the display interface reaches the edge (whether the side edge or the bottom edge) of the display screen 401, the prompt is sent out (it may also be that the bottom angle stays at the edge of the display 401 for 0.5 seconds, further, the electronic device recognizes that the bottom angle of the display interface stays at the edge of the display screen 401 for more than 0.5 seconds, then the prompt is sent out. In the embodiments of the present application, the residence time is not limited and can be adjusted according to actual development or use requirements). At this time, the user loosens his hand, the electronic device responds to the operation instruction of loosening the hand, the display interface of the target application 402 is switched to full screen, and the full screen display interface is shown in picture. 44. The content of the prompt can prompt the user to enter the switching full screen display state when the user loosens the hand at the moment, cancel the switching of the full screen display state when sliding inward. The prompt may be in a manner of displaying a gray full-screen similar size graphic on the display screen of the electronic device, to prompt the user that the target application 402 becomes full-screen display when the user loosens the hand at this time. The two behaviors of dragging and adjusting the size of the floating window and switching to the full screen can be organically and intuitively combined together; and the balance of efficiency, function and beauty is ingeniously achieved.

Figure 4C:
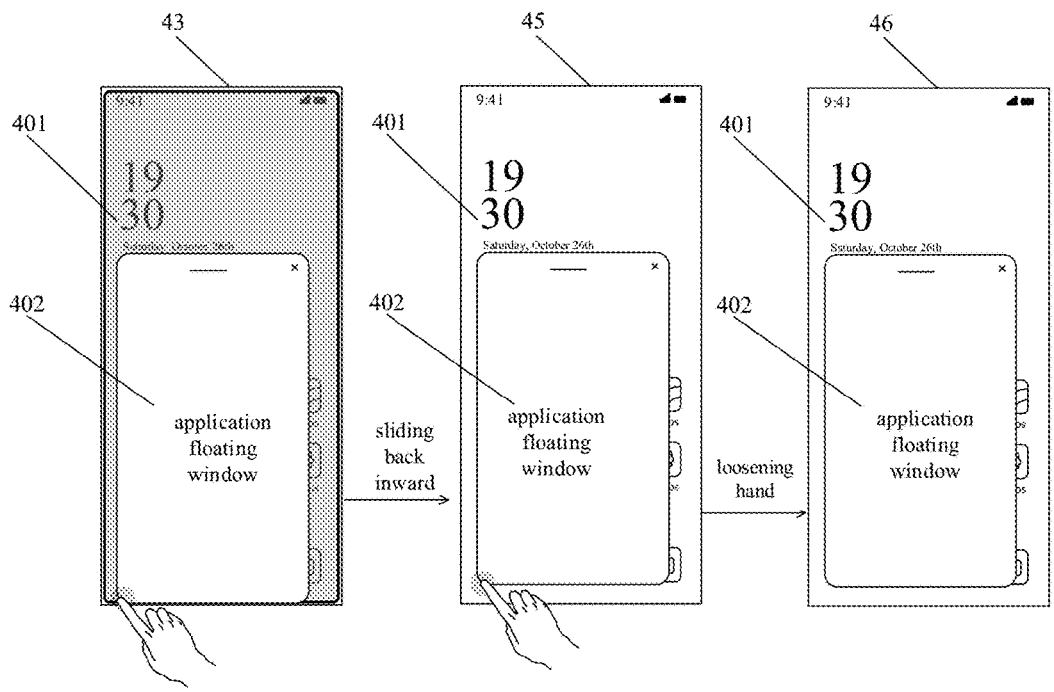
FIG. 4C is a third adjustment operation schematic diagram for switching to the full screen display according to an embodiment of the present application.

FIG. 4C is a third adjustment operation schematic diagram for switching to full screen display according to an embodiment of the present application. As shown in FIG. 4C, when the user slides back inward instead of loosening his hand after the electronic device gives a prompt, as shown in picture 45, the electronic device responds to the inward sliding back operation instruction, and cancels full screen switching. When the user slides back and loosens his hand, the electronic device responds to the operation instruction of loosening the hand, adjusts the size of the display interface of the target application 402 in the display screen 401 according to the endpoint position of the sliding operation, and the interface after the size adjustment is shown in picture 46.

Figure 5A:
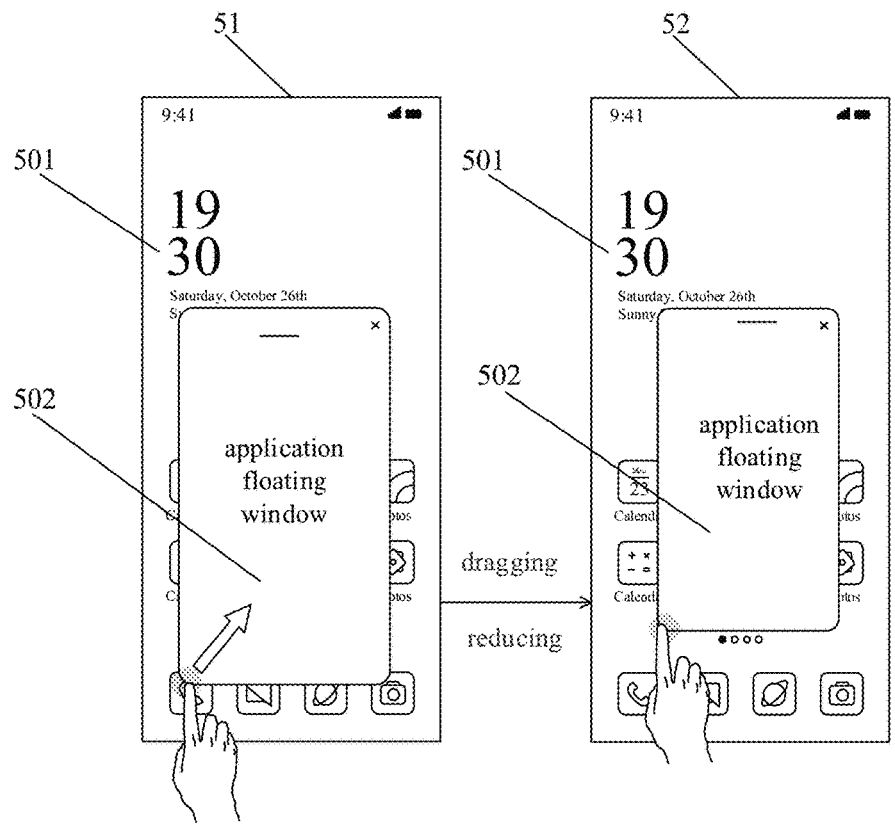
FIG. 5A is a first adjustment operation schematic diagram for switching to an icon display according to an embodiment of the present application.

FIG. 5A is a first adjustment operation schematic diagram for switching to icon display according to an embodiment of the present application. In FIG. 5A, as shown in picture 51, the target application 502 is displayed on the display 501 of the electronic device, and the target application 502 is displayed on the display screen 501 in a floating window manner, the user can adjust the size of the display interface in the display screen 501 by dragging the bottom angle of the display interface of the target application 502, so that the electronic device responds to the dragged operation instruction to correspondingly adjusts the size of the display interface of the target application 502 in the display screen 501. When the user drags the base angle inward, the electronic device reduces the display interface of the target application 502, and the reduced display interface is shown in the picture 52.

Figure 5B:
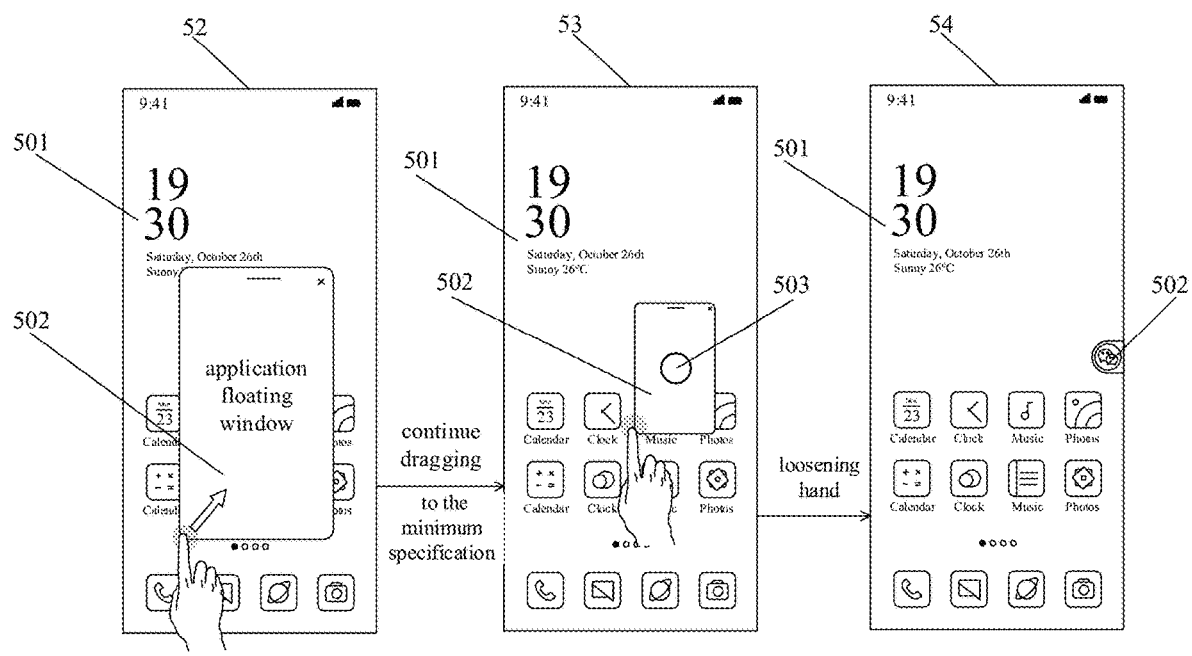
FIG. 5B is a second adjustment operation schematic diagram for switching to the icon display according to an embodiment of the present application.

FIG. 5B is a second adjustment operation schematic diagram for switching to icon display according to an embodiment of the present application. In FIG. 5B, as shown in picture 53, the user continues to drag the bottom angle of the display interface of the target application 502 inward, until the bottom angle of the display interface is dragged inwardly to the set minimum specification (here, the minimum specification is generally set during the development phase, but can also be open for user setability), the prompt is sent out (the prompt can also stay for 0.5 second after reaching the set minimum specification, further, the electronic device recognizes that the display interface of the target application 502 stays at a minimum size for more than 0.5 seconds, then the prompt is sent out. In the embodiments of the present application, the residence time is not limited and can be adjusted according to actual development or use requirements). The prompt may be displaying an image 503 in the center of the display interface of the target application 502. At this time, the user loosens his hand, the electronic device responds to the operation instruction of loosening the hand, and switches the display interface of the target application 502 to a "bubble"-like icon display, and the interface for icon display is shown in FIG. 54. In the embodiments of the present application, the interface switching result after the size is reduced is not limited, can be "bubble" type icon, can also be other types of icon, can also be a thumbnail, mini-window, and the like. In this way, the two behaviors of dragging to adjust the size of the floating window and switching to icons (or thumbnails, mini windows, etc.) can be organically and intuitively combined together; and the balance of efficiency, function and beauty can be ingeniously achieved.

Figure 5C:
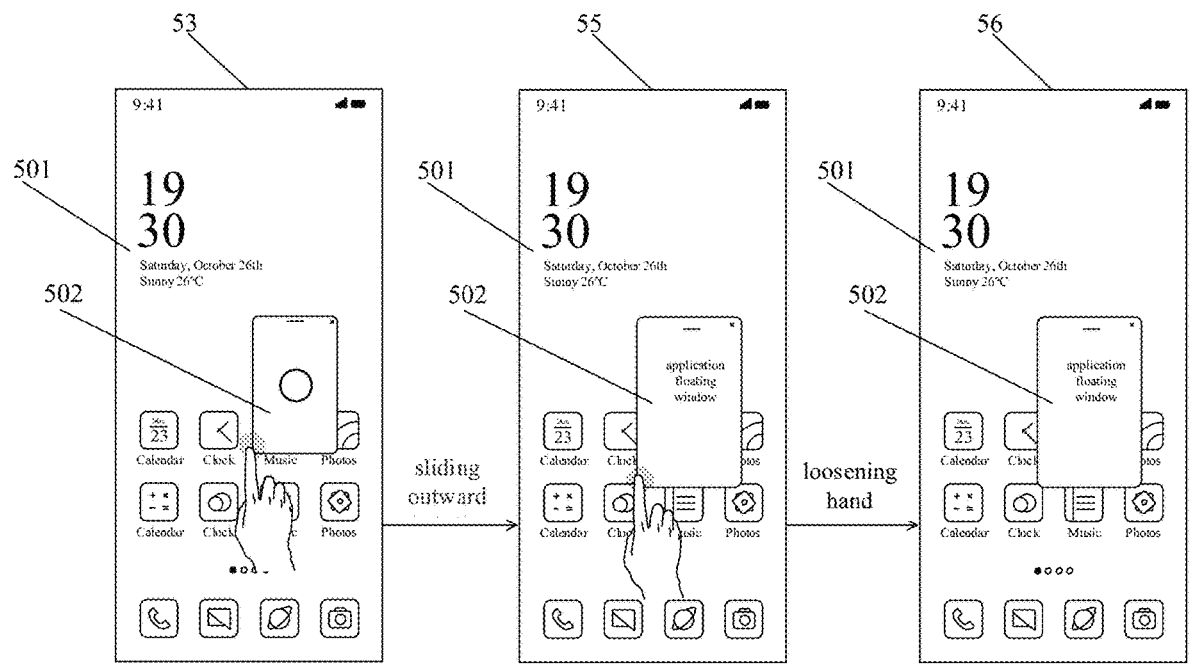
FIG. 5C is a third adjustment operation schematic diagram for switching to the icon display according to an embodiment of the present application.

FIG. 5C is a third adjustment operation schematic diagram for switching to icon display according to an embodiment of the present application, in FIG. 5C, as shown in picture 55, when the user slides outward instead of loosening his hand after the electronic device gives the prompt, the electronic device responds to the outward sliding operation instruction, and cancel icon switching. When the user slides out and loosens the hand, the electronic device responds to the operation instruction of loosening the hand and adjusts the size of the display interface of the target application 502 in the display screen 501 according to the endpoint position of the sliding operation, and the interface after the size adjustment is shown as the picture 56.

In some embodiments, a method for adjusting an interface display state, performed by an electronic device with a display screen is provided. The method includes: in response to a zooming operation for a display interface of a target application, determining size information of the display interface during the zooming operation. Achieving the zooming operation includes: dragging a bottom angle of the display interface of the target application; and in response to an end of the zooming operation, adjusting the display interface to a second display state when the size information of the display interface is less than or equal to a preset size information.

In some embodiments, the method for adjusting the interface display state, performed by the electronic device with the display screen further includes: when the size information of the display interface is less than or equal to the preset size information, the electronic device displays a first prompt information, and the first prompt information is configured to prompt a user to switch to the second display state when the user loosens hand at this time.

In some embodiments, the reducing the display interface to the second display state, includes: reducing the display interface to an icon display; or, reducing the display interface to a thumbnail display.

In some embodiments, the in response to the end of the zooming operation, reducing the display interface to the second display state when the size information of the display interface is less than or equal to the preset size information, includes: in response to the end of the zooming operation, when a time length that the size information of the display interface is less than or equal to the preset size information is greater than or equal to a preset time length, the display interface is reduced to the second display state.

In some embodiments, in response to the end of the zooming operation, a size of the display interface is adjusted according to a distance of dragging a bottom corner of the display interface of the target application during the zooming operation when the size information of the display interface is greater than the preset size information, or when a time length that the size information of the display interface is less than or equal to the preset size information is less than a preset time length; and a size of adjusted display interface is larger than a size of the display interface in the second display state.

In some embodiments, adjusting a size of the display interface according to a distance of dragging a bottom corner of the display interface of the target application during the zooming operation, includes: during dragging the bottom corner of the display interface of the target application outward, enlarging the size of the display interface according to a distance dragged by a user when stopping dragging; and during dragging the bottom corner of the display interface of the target application inward, reducing the size of the display interface according to the distance dragged by the user when stopping dragging; and a size of reduced display interface is larger than the preset size information.

In some embodiments, during dragging the bottom corner of the display interface of the target application outward, enlarging the size of the display interface according to a distance dragged by a user when stopping dragging, includes: adjusting the display interface to a first display state when a position information of the display interface is in a specific position range of the display screen, or when the size of the display interface matches a target size information. The target size information is greater than or less than the preset size information. Adjusting the display interface to a first display state includes adjusting the display interface to a full screen display.

Embodiments of the present application newly provide an interactive gesture. The gesture can bring more possibilities and convenience to the operation of the small window, simultaneously, the maximum beauty is kept. The balance of efficiency, function and beauty is ingeniously achieved in an intuitive natural mode. The small window in the embodiment of the present application refers to the small window in the display screen of the electronic device, and can be used for presenting a reduced application interface, so that the user can normally operate the application in the small window.

Based on above embodiments, the embodiment of the present application provides an apparatus for adjusting the interface display state. Every unit of the apparatus, every module of each unit, and every component of each module may be realized by the processor in the electronic device. It can also be realized by specific logic circuit. In the implementation process, the processor can be a central processing unit (CPU), a microprocessor unit (MPU), a digital signal processor (DSP), a field programmable gate array (FPGA) or the like.

An embodiment of the present application provides an apparatus for adjusting the interface display state. The apparatus includes a determining unit that is configured to determine the attribute information of the display interface during the zooming operation in response to the zooming operation for the display interface of the target application; and an adjusting unit that is configured to adjust the display state of the display interface in response to the end of the zooming operation when the attribute information satisfies the preset condition.

Figure 6:
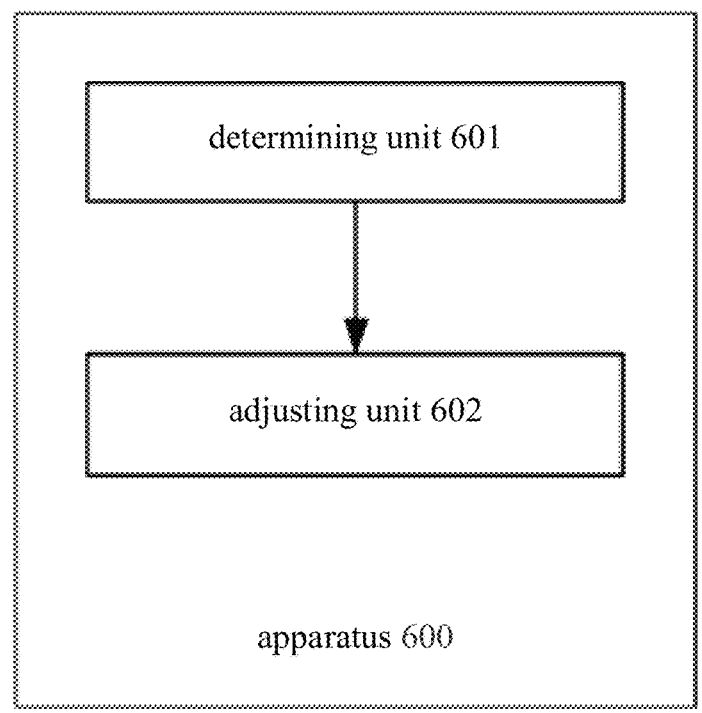
FIG. 6 is a schematic diagram of a construction of an apparatus for adjusting the interface display state according to an embodiment of the present application.

FIG. 6 is a schematic diagram of the construction of an apparatus for adjusting the interface display state according to an embodiment of the present application, as shown in FIG. 6, the apparatus 600 includes a determining unit 601 and an adjusting unit 602.

The determining unit 601 is configured to determine the attribute information of the display interface during the zooming operation in response to the zooming operation for the display interface of the target application.

The adjusting unit 602 is configured to adjust the display state of the display interface in response to the end of the zooming operation when the attribute information satisfies the preset condition.

In some embodiments, the adjusting unit 602 includes an adjustment sub-module. The adjustment sub-module is configured to adjust the display state of the display interface in response to the end of the zooming operation when the time length of the attribute information satisfying a preset condition is greater than or equal to a preset time length.

In some embodiments, the determining unit 601 includes a position determination module. The position determination module is configured to determine the position information of the boundary of the display interface during the enlarging operation in response to the enlarging operation for the display interface of the target application. Accordingly, the adjusting unit 602 includes a first adjustment module. The first adjustment module is configured to respond the end of the enlarging operation, and adjust the display interface to the first display state when the position information is within the specific position range of the display screen.

In some embodiments, the first adjustment module includes a first adjustment sub-module. The first adjustment sub-module is configured to adjust the display interface to the first display state in response to the end of the enlarging operation when the time length of the position information within the specific position range of the display screen is greater than or equal to the first preset time length.

In some embodiments, the first adjustment module includes a first adjustment component configured to adjust the display interface to the full screen display.

In some embodiments, the specific position range of the display screen includes at least one of: the top edge boundary range of the display screen, the bottom edge boundary range of the display screen, and the side edge boundary range of the display screen.

In some embodiments, the determining unit 601 includes a size determining module configured to determine the size information for the display interface of the target application in response to the reducing operation of the display interface. Accordingly, the adjusting unit 602 includes a second adjusting module configured to adjust the display interface to the second display state in response to the end of the reducing operation when the size information matches the preset size.

In some embodiments, the second adjusting module includes a second adjusting sub-module configured to adjust the display interface to the second display state in response to the end of the reducing operation when the time length that the size information matches the preset size is greater than or equal to the second preset time length.

In some embodiments, the second adjusting module includes a second adjusting component configured to adjust the display interface to icon display. The second adjusting component is further configured to adjust the display interface to thumbnail display.

In some embodiments, the apparatus further includes a first size adjusting unit configured to adjust the size of the display interface according to the zooming operation in response to the end of the zooming operation when the attribute information does not satisfy the preset condition.

In some embodiments, the apparatus further includes a second size adjusting unit configured to adjust the size of the display interface according to the zooming operation in response to the end of the zooming operation when the time length that the attribute information satisfies the preset conditions is less than the preset time length.

The description of the above apparatus embodiments is similar to the description of the above method embodiments and has the benefit of being similar to the method embodiments. For technical details not disclosed in the apparatus embodiments of the present application, reference should be made to the description of the method embodiments of the present application.

In embodiments of the present application, when the interface display state adjusting method is implemented in the form of a software function module, and sold or used as an independent product. It is also possible to store in a non-transitory computer-readable storage medium. Based on such understanding, the technical solution of the embodiment of the present application can be embodied in the form of a software product essentially or partially contributing to the prior art. The computer software product is stored in the non-transitory computer-readable storage medium, includes many instructions for causing an electronic device (which may be a personal computer, a server, or the like) to perform all or part of the methods described in various embodiments of the present application. The foregoing non-transitory computer-readable storage medium includes a USB flash disk, a mobile hard disk, a ROM (read only memories), a magnetic disk, an optical disk, or other media that store program code. Thus, embodiments of the present application are not limited to any particular hardware and software combination.

The embodiment of the present application provides an electronic device. The electronic device at least includes a memory, a communication bus, and a processor. The memory is configured to store an adjustment program of the interface display state. The communication bus is configured to realize the connection communication between the processor and the memory. The processor is configured to execute the adjustment program of the interface display state stored in the memory, to implement the operations of: in response to the zooming operation for the display interface of the target application, determining attribute information of the display interface during the zooming operation; and in response to the end of the zooming operation, adjusting the display state of the display interface when the attribute information satisfies the preset condition.

In some device embodiments, "in response to the end of the zooming operation, adjusting the display state of the display interface when the attribute information satisfies the preset condition" includes: in response to the end of the zooming operation, adjusting the display state of the display interface when the time length of the attribute information satisfying the preset condition is greater than or equal to the preset time length.

In some device embodiments, "in response to the zooming operation for the display interface of the target application, determining the attribute information of the display interface during the zooming operation" includes: in response to the enlarging operation for the display interface of the target application, determining the position information of the boundary of the display interface during the enlarging operation.

The "in response to the end of the zooming operation, adjusting the display state of the display interface when the attribute information satisfies the preset condition" includes: in response to the end of the enlarging operation, adjusting the display interface to the first display state when the position information is in the specific position range of the display screen.

In some device embodiments, "in response to the end of the enlarging operation, adjusting the display interface to the first display state when the position information is in the specific position range of the display screen" includes: in response to the end of the enlarging operation, adjusting the display interface to the first display state when the time length of the position information within the specific position range of the display screen is greater than or equal to the first preset time length.

In some device embodiments, "adjusting the display interface to the first display state" includes adjusting the display interface to the full screen display.

In some device embodiments, "specific position range of the display screen" includes at least one of: the top edge boundary range of the display screen, the bottom edge boundary range of the display screen, and the side edge boundary range of the display screen.

In some device embodiments, "in response to the zooming operation for the display interface of the target application, determining the attribute information of the display interface during the zooming operation" includes: determining the size information of the display interface in response to the reducing operation for the display interface of the target application.

The "in response to the end of the zooming operation, adjusting the display interface to the first display state when the attribute information satisfies the preset condition" includes: in response to the end of the reducing operation, adjusting the display interface to the second display state when the size information is matched with the preset size.

In some device embodiments, "in response to the end of the reducing operation, adjusting the display interface to the second display state when the size information is matched with the preset size" includes: in response to the end of the reducing operation, adjusting the display interface to the second display state when the time length of the size information matched with the preset size is greater than or equal to the second preset time length.

In some device embodiments, "adjusting the display interface to the second display state" includes: adjusting the display interface to the icon display; alternatively, adjusting the display interface to the thumbnail display.

In some device embodiments, the processor is configured to perform the adjustment program of the interface display state stored in the memory to implement the following operations: in response to the end of the zooming operation, adjusting the size of the display interface according to the zooming operation when the attribute information does not satisfy the preset condition.

In some device embodiments, the processor is configured to perform the adjustment program of the interface display state stored in the memory to implement the following operations: in response to the end of the zooming operation, adjusting the size of the display interface according to the zooming operation when the time length of the attribute information satisfying the preset condition is less than the preset time length.

The embodiment of the present application provides a non-transitory computer readable storage medium, wherein the computer program is stored on the readable non-transitory computer-readable storage medium. When the computer program is executed by the processor, the operations in the method for adjusting the display state of the interface are realized.

The description of the above non-transitory computer-readable storage medium and apparatus embodiments is similar to the description of the above method embodiments and has the benefit of being similar to the method embodiments. For technical details not disclosed in the non-transitory computer-readable storage medium and apparatus embodiments of the present application, reference should be made to the description of the method embodiments of the present application.

Figure 7:
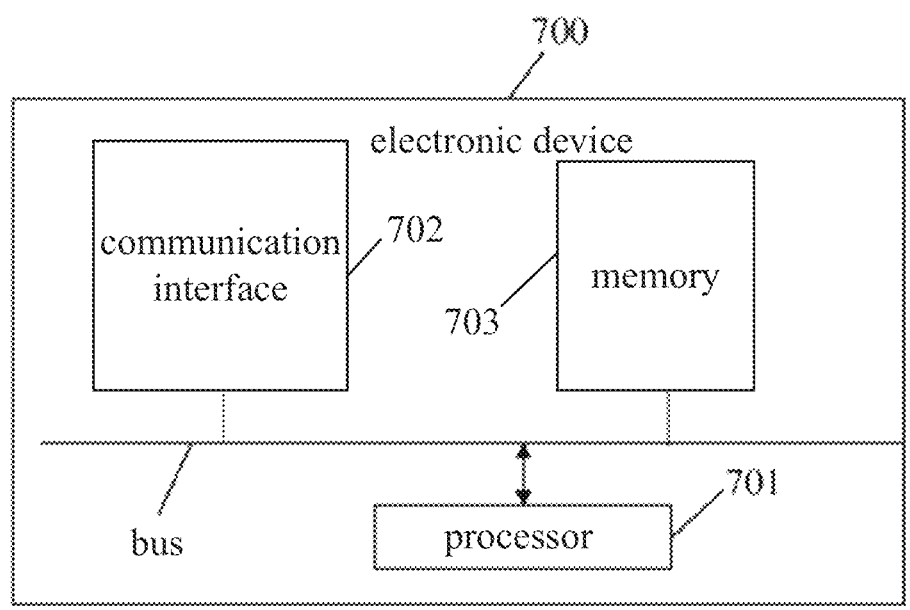
FIG. 7 is a schematic diagram of a hardware entity of an electronic device according to an embodiment of the present application.

FIG. 7 is a schematic diagram of a hardware entity of an electronic device according to an embodiment of the present application. As shown in FIG. 7, the hardware entity of the electronic device 700 includes a processor 701, a communication interface 702, and a memory 703.

The processor 701 typically controls the overall operation of electronic device 700.

The communication interface 702 may enable the electronic device 700 to communicate with other electronic devices or servers by a network.

The memory 703 is configured to store instructions and applications executable by the processor 701, may also buffer data (e.g., image data, audio data, voice communication data, and video communication data) to be processed or already processed of the processor 701 and various modules in the electronic device 700, which may be implemented by a flash or RAM (random access memory).

In several embodiments provided by present application, it should be understood that, the disclosed device and method may be implemented in other ways. The device embodiments described above are only schematic, for example, the division of the unit, is only a logical function division, the actual implementation may have another division method, such as, a plurality of units or components may be combined, or can be integrated into another system, or some features can be ignored, or not performed. In addition, coupled or directly coupled or communication connection of the components shown or discussed may be connected through some interfaces, indirect coupling of devices or units, or communication connection, which may be electrical, mechanical or otherwise.

The unit described above as a separate component may or may not be physically separate, and the component shown as a unit may or may not be a physical unit, i.e., may be located in one place or may be distributed on a plurality of network units. Some or all of the units may be selected according to actual needs to achieve the purpose of the present embodiment.

In addition, each functional unit in each embodiment of the present application can be integrated in one processing module, or each unit can be used as one unit independently, or two or more units can be integrated in one unit. The above integrated unit can be implemented in the form of hardware, or in the form of hardware plus software functional unit. Those of ordinary skill in the art may understand: all or part of the operations to implement the embodiment of the above method may be completed by the hardware associated with the program instruction, the aforementioned program may be stored in a non-transitory computer-readable storage medium. When the program is executed, operations including embodiments of the above method are performed. The aforementioned storage media include a removable storage device, a ROM, a RAM, a disk, an optical disc, or other media that can store program code.

The methods disclosed in several embodiments of the present application can be arbitrarily combined without conflicting condition, to obtain new method embodiments. The features disclosed in several product embodiments provided in the present application may be arbitrarily combined without conflicting condition, to obtain new product embodiments. The features disclosed in several methods or device embodiments provided in the present application may be arbitrarily combined without conflicting condition, to obtain new method embodiments or device embodiments.

The above are only specific embodiments of the present application, but the scope of protection of the present application is not limited thereto. In the scope of the technology disclosed in the present application, any change or replacement that can be easily thought by any technicians familiar with the technical field, should be covered by the scope of protection of present application. Therefore, the protection scope of present application shall be based on the protection scope of the claimed rights.

What is claimed is:

1. A method for adjusting an interface display state, performed by an electronic device with a display screen, and comprising:

in response to a zooming operation for a display interface of a target application, determining attribute information of the display interface during the zooming operation; and in response to an end of the zooming operation, adjusting a display state of the display interface when the attribute information satisfies a preset condition;

wherein the in response to the zooming operation for the display interface of the target application, determining the attribute information of the display interface during the zooming operation, comprises: in response to an enlarging operation for the display interface of the target application, determining a position information of a boundary of the display interface during the enlarging operation;

in response to the end of the zooming operation, adjusting the display state of the display interface when the attribute information satisfies the preset condition, comprises: in response to the end of the enlarging operation, adjusting the display interface to a first display state when the position information is in a specific position range of the display screen; and the adjusting the display interface to the first display state, comprises: adjusting the display interface to a full screen display.

2. The method as claimed in claim 1, wherein the in response to the end of the zooming operation, adjusting the display state of the display interface when the attribute information satisfies the preset condition, comprises:

in response to the end of the zooming operation, adjusting the display state of the display interface when a time length of the attribute information satisfying the preset condition is greater than or equal to a preset time length.

3. The method as claimed in claim 1, wherein the specific position range of the display screen comprises at least one of:

a top edge boundary range of the display screen, a bottom edge boundary range of the display screen, and a side edge boundary range of the display screen.

4. The method as claimed in claim 1, wherein the in response to the zooming operation for the display interface of the target application, determining the attribute information of the display interface during the zooming operation, comprises: in response to a reducing operation for the display interface of the target application, determining a size information of the display interface; and the in response to the end of the zooming operation, adjusting the display interface to the first display state when the attribute information satisfies the preset condition, comprises: in response to the end of the reducing operation, adjusting the display interface to a second display state when the size information is matched with a preset size.

5. The method as claimed in claim 4, wherein the adjusting the display interface to the second display state, comprises:

adjusting the display interface to an icon display; or, adjusting the display interface to a thumbnail display.

6. The method as claimed in claim 4, wherein in response to the end of the zooming operation, when the size information of the display interface is greater than the preset size, or a time length that the size information of the display interface is less than or equal to the preset size is less than a preset time length, a size of the display interface is adjusted according to a distance of dragging a bottom corner of the display interface of the target application during the zooming operation; and the size of adjusted display interface is larger than the size of the display interface in the second display state.

7. The method as claimed in claim 1, further comprising:

in response to the end of the zooming operation, adjusting a size of the display interface according to the zooming operation when the attribute information does not satisfy the preset condition.

8. An electronic device, comprising:

a memory, configured to store an adjustment program of an interface display state;

a communication bus, configured to realize a connection communication between a processor and the memory; and a processor, configured to execute the adjustment program of the interface display state stored in the memory to implement operations comprising:

in response to a zooming operation for a display interface of a target application, determining attribute information of the display interface during the zooming operation; and in response to an end of the zooming operation, adjusting a display state of the display interface when the attribute information satisfies a preset condition;

wherein the in response to zooming operation for the display interface of the target application, determining the attribute information of the display interface during the zooming operation, comprises: in response to an enlarging operation for the display interface of the target application, determining a position information of a boundary of the display interface during the enlarging operation; and the in response to the end of the zooming operation, adjusting the display state of the display interface when the attribute information satisfies the preset condition, comprises: in response to the end of the enlarging operation, adjusting the display interface to a first display state when the position information is in a specific position range of the display screen.

9. The electronic device as claimed in claim 8, wherein the in response to the end of the zooming operation, adjusting the display state of the display interface when the attribute information satisfies the preset condition, comprises:

in response to the end of the zooming operation, adjusting the display state of the display interface when a time length of the attribute information satisfying the preset condition is greater than or equal to a preset time length.

10. The electronic device as claimed in claim 8, wherein the in response to the zooming operation for the display interface of the target application, determining the attribute information of the display interface during the zooming operation, comprises: in response to a reducing operation for the display interface of the target application, determining a size information of the display interface; and the in response to the end of the zooming operation, adjusting the display interface to the first display state when the attribute information satisfies the preset condition, comprises: in response to the end of the reducing operation, adjusting the display interface to a second display state when the size information is matched with a preset size.

11. A method for adjusting an interface display state, performed by an electronic device with a display screen, and comprising:

in response to a zooming operation for a display interface of a target application, determining size information of the display interface during the zooming operation, wherein achieving the zooming operation comprises: dragging a bottom angle of the display interface of the target application; and in response to an end of the zooming operation, adjusting the display interface to a second display state when the size information of the display interface is less than or equal to a preset size information;

wherein the reducing the display interface to the second display state, comprises: reducing the display interface to an icon display; or, reducing the display interface to a thumbnail display.

12. The method as claimed in claim 11, further comprising: when the size information of the display interface is less than or equal to the preset size information, the electronic device displays a first prompt information, and the first prompt information is configured to prompt a user to switch to the second display state when the user loosens hand at this time.

13. The method as claimed in claim 11, wherein the in response to the end of the zooming operation, reducing the display interface to the second display state when the size information of the display interface is less than or equal to the preset size information, comprising:

in response to the end of the zooming operation, the display interface is reduced to the second display state when a time length that the size information of the display interface is less than or equal to the preset size information is greater than or equal to a preset time length.

14. The method as claimed in claim 11, further comprising:

in response to the end of the zooming operation, adjusting a size of the display interface according to a distance of dragging a bottom corner of the display interface of the target application during the zooming operation when the size information of the display interface is greater than the preset size information, or when a time length that the size information of the display interface is less than or equal to the preset size information is less than a preset time length; wherein a size of adjusted display interface is larger than a size of the display interface in the second display state.

15. The method as claimed in claim 14, wherein the adjusting a size of the display interface according to a distance of dragging a bottom corner of the display interface of the target application during the zooming operation, comprises:

during dragging the bottom corner of the display interface of the target application outward, enlarging the size of the display interface according to a distance dragged by a user when stopping dragging; and during dragging the bottom corner of the display interface of the target application inward, reducing the size of the display interface according to the distance dragged by the user when stopping dragging; wherein a size of reduced display interface is larger than the preset size information.

16. The method as claimed in claim 15, wherein the during dragging the bottom corner of the display interface of the target application outward, enlarging the size of the display interface according to a distance dragged by a user when stopping dragging, comprises:

adjusting the display interface to a first display state when a position information of the display interface is in a specific position range of the display screen, or when the size of the display interface matches a target size information; wherein the target size information is greater than or less than the preset size information; and wherein the adjusting the display interface to a first display state comprises adjusting the display interface to a full screen display.

* * * * *